(No Model.)
W. J. McCOY.
HOSE AND PIPE COUPLING.
No. 342,527. Patented May 25, 1886.
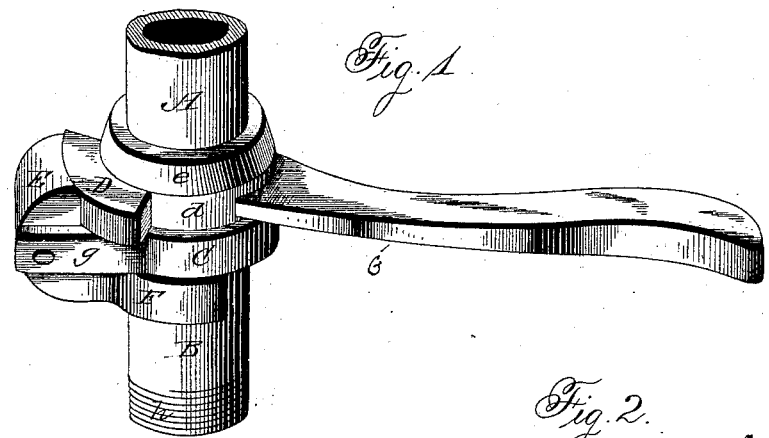
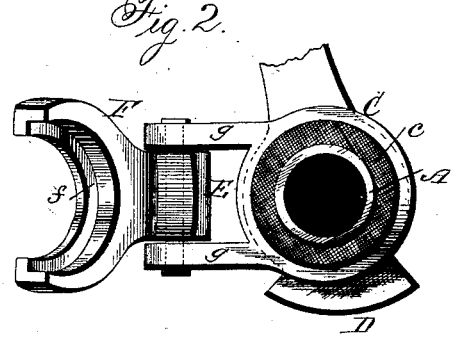
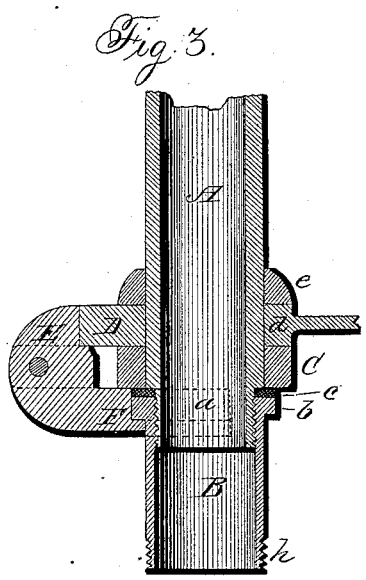
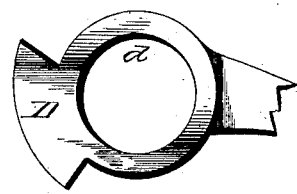
Witnesses:
Jas. E. Hutchinson
L. L. Miller.
Inventor.
William J. McCoy,
per Chas. H. Fowler,
Attorney.

UNITED STATES PATENT OFFICE.

WILLIAM J. McCOY, OF JEFFERSONVILLE, INDIANA.

HOSE AND PIPE COUPLING.

SPECIFICATION forming part of Letters Patent No. 342,527, dated May 25, 1886.

Application filed March 29, 1886. Serial No. 196,967. (No model.)

*To all whom it may concern:*

Be it known that I, WILLIAM J. McCOY, a citizen of the United States, residing at Jeffersonville, in the county of Clark and State of Indiana, have invented certain new and useful Improvements in Hose and Pipe Couplings; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, an end view thereof; Fig. 3, a longitudinal section, and Fig. 4 a detail view of the ring or band and cam formed thereon.

The present invention has for its object to provide a simple and effective device for coupling fire-hose, air-brake hose, or any hose or pipe where a coupling is used—such as fire-plugs, siphon-pipes, &c.; and it consists in the details of construction, substantially as shown in the drawings and hereinafter described and claimed.

In the accompanying drawings, A represents a section of hose or pipe, which is permanently connected to the engine or other object and has an exteriorly-screw-threaded nipple a, with which engages a screw-threaded sleeve, B, having at its inner end a shoulder, b, and between this shoulder and a collar, C, is a suitable washer or packing-ring, c, of rubber or any other desirable material used as packing.

The hose or pipe section A is intended to have screw-threads upon its interior, to screw onto the engine where the usual hose is now screwed on, and is left there permanently. A ring or band, d, encircles the pipe-section A, and is held in place thereon by the inner side of the collar C and rim e, both of which are a permanent fixture to the pipe-section. The ring or band d works easily around the pipe-section, and is formed with a cam, D, which bears against the concave face of a head, E. The head is formed on a clutch, F, which straddles the sleeve B, and is rabbeted, as shown at f, to overlap the shoulder b, and thus firmly hold the sleeve to the pipe-section.

The head E is at right angles to the clutch F, and is pivoted between arms g, formed on the collar C, and by releasing the cam D from contact with the head E the clutch can be swung back, as shown in Fig. 2, and the sleeve B detached, and, if found necessary, a new coupling made with other hose or pipe.

The sleeve B, as will be seen, has a screw-thread on its exterior, as shown at h, so that any ordinary hose-coupling will screw on it, so that if the coupling-section of pipe A becomes broken or disabled the next section of pipe can be attached to section A with the ordinary coupling.

In making the coupling with my improved device, the clutch F is brought forward until the rabbeted side f falls on the annular shoulder b and overlaps the same, and by turning the band or ring d in the proper direction the cam D is brought against the concave face of the head E, and thus firmly brings the clutch against the ring sufficiently to make a safe, tight, and secure coupling.

Any desirable or well-known means may be employed to turn the band or ring d for operating the cam—such as a lever, G—or a nut may be formed on the ring, or what is termed a "spanner" or key may be used, as found desirable.

Having now fully described my invention, what I claim as new, and desire to secure by Letters Patent, is—

In a hose or pipe coupling, a cam formed on a band or ring encircling the end of a pipe-section, and provided with suitable means by which it may be turned, in combination with a pivoted clutch having a rabbeted inner side, and a head formed with a concave face against which the cam bears, substantially as and for the purpose set forth.

In testimony that I claim the above I have hereunto subscribed my name in the presence of two witnesses.

WM. J. McCOY.

Witnesses:
A. J. BURLINGAME,
C. W. PRATHER.